United States Patent [19]
Al Ghatta et al.

[11] Patent Number: 6,143,837
[45] Date of Patent: Nov. 7, 2000

[54] PROCESS FOR THE PREPARATION OF POLYESTER RESIN

[75] Inventors: Hussain Al Ghatta, Fiuggi; Enrico Ballico, Marino; Arianna Giovannini, Bologna, all of Italy

[73] Assignee: Sinco Ricerche, S.p.A., Italy

[21] Appl. No.: 09/468,158

[22] Filed: Dec. 21, 1999

[30] Foreign Application Priority Data

Dec. 23, 1998 [IT] Italy .................................. MI98A2803

[51] Int. Cl.⁷ ............................. C08F 20/00; C08G 63/78
[52] U.S. Cl. ...................... 525/437; 528/272; 528/279; 528/298; 528/302; 528/308; 528/308.6; 528/487; 528/503; 524/711; 524/783; 524/706
[58] Field of Search ..................... 528/272, 279, 528/298, 302, 308, 308.6, 486, 487, 503; 525/437; 524/706, 711, 783

[56] References Cited

U.S. PATENT DOCUMENTS 6,057,016   5/2000   Al Ghatta et al. ..................... 428/35.7

*Primary Examiner*—Samuel A. Acquah
*Attorney, Agent, or Firm*—Cook, Alex, McFarron, Manzo, Cummings & Mehler, Ltd.

[57] ABSTRACT

A process for the preparation of aromatic polyester resins, in which the resin obtained from the polycondensation phase in the molten state conducted by utilizing a titanium based compound as a catalyst, is subjected to a solid state polycondensation reaction in the presence of a dianhydride of a tetracarboxylic acid.

8 Claims, No Drawings

PROCESS FOR THE PREPARATION OF POLYESTER RESIN

BACKGROUND OF THE INVENTION

The present invention is directed to an improved process for the production of polyester resin having a high intrinsic viscosity.

The catalysts normally used in polycondensation of aromatic polyester resins in the molten state are in general compounds of antimony (principally, antimony oxide and antimony triacetate). Catalysts based on germanium oxide are also usable but only in certain cases, given the high cost of the catalyst.

Titanium compounds (in particular titanium alkoxides) have also been proposed as catalysts. These catalysts have a high activity, but lead to the formation of a polymer with a yellowish colouration and further, have problems of instability due to hydrolysis during synthesis of PET from terephthalic acid. The kinetics of polycondensation of the resin to the solid state is moreover detrimentally affected by the presence of titanium compounds. Because of these disadvantages, titanium catalysts have not in practice found to have an application.

Currently, the tendency of the market and the authorities competent for safeguarding the environment is to require ever more insistently a PET having a low content of residual metal catalysts. It is not, however, in practice possible to reduce the quantity of antimony catalysts because their activity is not very high.

The use of titanium catalysts is not satisfactory because of their low activity in the solid state polycondensation.

A necessity therefore exists to have available inexpensive catalysts other than those of antimony, which will not be a health hazard and which will provide good catalytic activity without presenting possible problems of colouration of the polymer.

Recently titanium dioxide and silica in the ratio Ti:Si of 9:1, and tetraisopropyl (dioctyl) titanate phosphite have been proposed as hydrolysis resistant catalysts having few problems with yellowing when compared to titanium alkoxides. The activity of these catalysts (expressed as ppm by weight of Ti/kg polymer) is very much higher than that obtainable with antimony oxide or triacetate.

These catalysts, however, also have the serious disadvantage in that their use is, in practice, precluded due to the low kinetics when they are employed for the solid state polycondensation of the resin.

With respect to antimony catalysts, in the case of PET, the kinetics of solid state polycondensation are about 50% less (for the same conditions).

SUMMARY OF THE INVENTION AND DETAILED DESCRIPTION OF THE PRESENTLY PREFERRED EMBODIMENTS

It has now been unexpectedly found that it is possible to utilize titanium catalysts in the polycondensation reaction of the polyester resin in the molten state and to obtain kinetics of the solid state polycondensation comparable and possibly better than those of polymers prepared utilizing antimony catalysts if the solid state polycondensation is conducted in the presence of a dianhydride of a tetracarboxylic acid, preferably aromatic.

Pyromellitic dianhydride is preferred. The dianhydrides are added to the polyester resin in quantities of about 0.05 to 2% by weight.

The solid state polycondensation reaction is effected according to known methods by operating at a temperature between 160° and 230° C. for a time sufficient to obtain an increase of at least 0.1 dl/g of intrinsic viscosity for the starting resin. The viscosity of the starting resin is in general between 0.4–0.7 dl/g. It is, however, possible to start from resins with viscosity lower than 0.4 dl/g, for example, 0.2–0.3 dl/g.

The dianhydride is mixed with the resin in the molten state operating, for example, in extruders with relatively short residence times (several tens of seconds).

Polycondensation in the molten state of the polyester resin is achieved according to conventional methods using quantities of titanium catalysts equal to 20–200 ppm by weight of titanium with respect to the polymer.

Since the catalytic activity of titanium is much higher that that obtainable with antimony catalysts (less ppm of metal per kg of polymer), it is possible to reduce the polycondensation times in the melt for the same ppm of metal used, thus increasing the productivity of the installation.

Titanium compounds usable as catalysts generally comprise titanium alkoxides, in particular, titanium tetraethoxy, tetrapropoxy and tetrabutoxy, and tetraisopropyl (dioctyl) titanate phosphite and the acetyl acetonates of titanium, such as titanium acetylacetoyl and titanium diacetyl acetoxide and titanium dioxide-silica mixture.

The polyester resins in the synthesis of which the titanium catalysts are usable are obtained by polycondensation according to known methods from a diol with 2–12 carbon atoms and aromatic dicarboxylic acids, preferably terephthalic acid, or by transesterification of their lower aliphatic diesters for example dimethyl terephthalate and subsequent polycondensation. Diols usable are for example ethylene glycol, propylene glycol, butylene glycol and 1,4-cyclohexanedimethylol.

Preferred resins are polyethylene terephthate and ethylene terephthalic copolymers in which up to 20% by weight of units deriving from terephthalic acid are substituted by units of isophthalic and/or napthalene dicarboxylic acid.

Polyester resins obtainable with the process of the present invention find application in all fields in which polyester resins are normally used. In particular, they are used for the preparation of containers by injection blow moulding or extrusion blow moulding and in the preparation of expanded materials.

In table 1, there are recorded the polycondensation conditions of bis-hydroxyethyl terephthalate (BHET), and the results obtained by using a titanium catalyst (mixture of titanium dioxide and silica; Ti/Si ratio 9:1; C-94 from Akzo Nobel) and an antimony catalyst (antimony triacetate S21 from Atochem).

TABLE 1

|  | Test With Antimony | Test With Titanium |
|---|---|---|
| Polycondensation Temperature (° C.) (Starting value) | 267 | 267 |
| Vacuum (mbar) | 1–5 | 1.0 |
| Polycondensation Time | 4h 30' | 4h 30' |
| Final Polycondensation Temperature (° C.) | 269 | 270 |
| Quantity of Catalyst (ppm metal) | 240 | 60 |
| Intrinsic Viscosity (dl/g) | 0,653 | 0,673 |

TABLE 1-continued

|  | Test With Antimony | Test With Titanium |
|---|---|---|
| Activity (IV$_f$/hrs*ppm Me) | 0,002481 | 0,000602 |
| Activity Ti/Activity Sb | 4,123077 | — |
| Terminal Acid Groups Eq/T | 13 | 13.8 |
| Colour |  |  |
| L* | 71 | 76 |
| a* | −2.86 | −2.48 |
| b* | −1.27 | 4.73 |

From the data of the table, it is apparent that the titanium catalyst is four times more active than the antimony catalyst (activity expressed as increment of intrinsic viscosity per ppm of metal per hour of reaction).

The colour index b* of the polymer obtained with the titanium catalyst is significantly higher than in the polymer containing the antimony catalyst (the disadvantage can, however, be easily eliminated by adding to the catalyst small percentages of a cobalt compound or other organic colorants).

In table 2 are recorded the I.V. data relating to the solid state polycondensation (195° C. in a nitrogen current) of the polymer obtained with the antimony catalyst and that with the titanium catalyst.

TABLE 2

|  | Test With Antimony | | Test With Titanium | |
|---|---|---|---|---|
| Time (Hours) | without PMDA | with 0.4% w PMDA | without PMDA | with 0.4% w PMDA |
| 0 | 0.653 | 0.653 | 0.673 | 0.673 |
| 2 | 0.717 | 0.804 | 0.695 | 0.845 |
| 4 | 0.754 | 1.020 | 0.732 | 0.982 |
| 6 | 0.813 | 1.328 | 0.755 | 1.350 |

TABLE 3

|  | Test With Antimony | Test With Titanium |
|---|---|---|
| Polycondensation Temp (° C.) | 267 | 267 |
| Vacuum (mbar) | 1–2 | 1–2 |
| Polycondensation Time | 4h 15' | 5h |
| Final Polycondensation Temp (° C.) | 270 | 270 |
| Quantity of Catalyst (ppm Me) | 219 | 28 |
| Intrinsic Viscosity (dl/g) | 0.670 | 0.655 |
| Activity (IV$_f$/hrs* ppm Me) | 0.000737 | 0.0046429 |
| Activity Ti/Activity Sb | 6.2980011 | — |
| Terminal Acid Groups (Eq/T) | 27.20 | 21.23 |
| Colour |  |  |
| L* | 67.74 | 70.14 |

TABLE 3-continued

|  | Test With Antimony | Test With Titanium |
|---|---|---|
| a* | −3.03 | −2.92 |
| b* | −1.52 | 5.24 |

Analytical Measurements

The intrinsic viscosity of the polyester resin was measured in solution of 0.5 g of resin in 100 ml of 60/40 mixture by weight of phenol and tetrachloroethane at 25° C. according to ASTM D4603-86.

What is claimed is:

1. A process for the preparation of polyester resins having an intrinsic viscosity greater than 0.7 dl/g starting from resins with an intrinsic viscosity of 0.2–0.7 dl/g obtained by polycondensation of diols with 2–12 carbon atoms and aromatic dicarboxylic acids or by transesterification of the lower alkyl esters of the dicarboxylic acids and subsequent polycondensation, using in the polycondensation phase a catalyst comprising a titanium compound, wherein the polyester resin obtained from the polycondensation is added with a dianhydride of a tetracarboxylic acid and subsequently subjected to solid state polycondensation to obtain an intrinsic viscosity increase of at least 0.1 dl/g.

2. A process according to claim 1, in which the titanium compound is selected from the group consisting of alkoxides of titanium, acetyl acetonates of titanium, dioxides of titanium and titanate phosphites.

3. A process according to claim 1, in which the dianhydride is the pyromellitic dianhydride.

4. A process according to claim 1, in which the polyester resin is polyethylene terephthalate and co-polyethylene terephthalate in which up to 20% by weight of units deriving from terephthalic acid are substituted by units deriving from isophthalic and/or naphthalene dicarboxylic acid.

5. A process according to claim 2, in which the polyester resin is polyethylene terephthalate and co-polyethylene terephthalate in which up to 20% by weight of units deriving from terephthalic acid are substituted by units deriving from isophthalic and/or naphthalene dicarboxylic acid.

6. A process according to claim 3, in which the polyester resin is polyethylene terephthalate and co-polyethylene terephthalate in which up to 20% by weight of units deriving from terephthalic acid are substituted by units deriving from isophthalic and/or naphthalene dicarboxylic acid.

7. A process according to claim 2, in which the dianhydride is the pyromellitic dianhydride.

8. A process according to claim 7, in which the polyester resin is polyethylene terephthalate and co-polyethylene terephthalate in which up to 20% by weight of units deriving from terephthalic acid are substituted by units deriving from isophthalic and/or naphthalene dicarboxylic acid.

* * * * *